United States Patent
Lecuyer et al.

(10) Patent No.: US 10,586,986 B2
(45) Date of Patent: Mar. 10, 2020

(54) ORGANIC LITHIUM BATTERY

(71) Applicants: BLUE SOLUTIONS, Ergue Gaberic (FR); CENTRE NATIONAL DE LA RECHERCHE SCIENTIFIQUE, Paris (FR); UNIVERSITE DE NANTES, Nantes (FR)

(72) Inventors: Margaud Lecuyer, Combrit (FR); Marc Deschamps, Quimper (FR); Joël Gaubicher, Nantes (FR); Philippe Poizot, Treillieres (FR); Dominique Guyomard, Sautron (FR); Bernard Lestriez, Nantes (FR)

(73) Assignees: BLUE SOLUTIONS, Ergue Gaberic (FR); UNIVERSITE DE NANTES, Nantes (FR); CENTRE NATIONAL DE LA RECHERCHE SCIENTIFIC, Paris (FR)

( * ) Notice: Subject to any disclaimer, the term of this patent is extended or adjusted under 35 U.S.C. 154(b) by 31 days.

(21) Appl. No.: 15/529,328

(22) PCT Filed: Nov. 30, 2015

(86) PCT No.: PCT/FR2015/053265
§ 371 (c)(1),
(2) Date: May 24, 2017

(87) PCT Pub. No.: WO2016/087759
PCT Pub. Date: Jun. 9, 2016

(65) Prior Publication Data
US 2017/0271677 A1  Sep. 21, 2017

(30) Foreign Application Priority Data

Dec. 1, 2014 (FR) .................... 14 61704

(51) Int. Cl.
| | | |
|---|---|---|
| *H01M 4/60* | (2006.01) | |
| *H01M 10/052* | (2010.01) | |
| *H01M 10/0565* | (2010.01) | |
| *H01M 10/0568* | (2010.01) | |

(52) U.S. Cl.
CPC .......... *H01M 4/60* (2013.01); *H01M 10/052* (2013.01); *H01M 10/0565* (2013.01); *H01M 10/0568* (2013.01); *H01M 2300/0085* (2013.01); *Y02T 10/7011* (2013.01)

(58) Field of Classification Search
CPC .. H01M 4/60; H01M 10/052; H01M 10/0565; H01M 10/0568; H01M 2300/0085; H01M 4/606
See application file for complete search history.

(56) References Cited

U.S. PATENT DOCUMENTS

| | | | | |
|---|---|---|---|---|
| 5,919,587 A | * | 7/1999 | Mukherjee | ............... H01B 1/12 429/213 |
| 6,300,009 B1 | * | 10/2001 | Yoshida | ............... C01G 39/006 429/218.1 |
| 2008/0213670 A1 | * | 9/2008 | Okada | ................... H01M 2/166 429/231.95 |
| 2009/0065730 A1 | * | 3/2009 | Yoshino | ................. C08G 67/02 252/62.2 |
| 2011/0143197 A1 | * | 6/2011 | Ohtsuka | ............... H01M 4/137 429/207 |
| 2013/0004836 A1 | | 1/2013 | Otsuka et al. | |
| 2014/0065490 A1 | * | 3/2014 | Otsuka | ................ H01M 10/052 429/326 |
| 2014/0248536 A1 | * | 9/2014 | Sato | ........................ H01M 4/60 429/213 |
| 2014/0272603 A1 | | 9/2014 | Yang et al. | |

FOREIGN PATENT DOCUMENTS

| | | | |
|---|---|---|---|
| JP | 07-320749 | * | 12/1995 |
| WO | WO 2013/008428 | * | 1/2013 |

OTHER PUBLICATIONS

Machine translation of JP 07-320749 published on Dec. 8, 1995 (Year: 1995).*
Translation of par.0018 and par.0019 of JP 07-320749, published on Dec. 8, 1995 (Year: 1995).*
Search Report dated Sep. 22, 2015.
Liang Y et al: "Organic Electode Materials for Rechargeable Lithium Batteries" Advance Energy Materials, Wiley-V C H Verlag GMBH & Co. KGAA, DE, vol. 2, No. 7, July 1, 2012.
WWW Electrochemsci Org et al: International Journal of Electrochemical Science—Pentacenetertrone as a High Capacity Organic Positive-Electode Material for Use in Rechargeable Lithium Batteries Int. J. Electochem. Sci, Jul. 7, 2011.
Lecuyer Margaud et al.: "A Rechargeable Lithium/Quinone Battery Using a Commerical Polymer Electrolyte", Electrochemistry Communications, vol. 55, Mar. 19, 2015.

* cited by examiner

*Primary Examiner* — Anca Eoff
(74) *Attorney, Agent, or Firm* — Ipsilon USA, LLP

(57) ABSTRACT

Organic lithium batteries are provided having high energy and power densities with a positive electrode based on redox organic compounds and an electrolyte having a high concentration of lithium salt.

15 Claims, 2 Drawing Sheets

ORGANIC LITHIUM BATTERY

RELATED APPLICATION

This application is a National Phase of PCT/FR2015/053265, filed on Nov. 30, 2015 which in turn claims the benefit of priority from French Patent Application No. 14 61704, filed on Dec. 1, 2014, the entirety of which are incorporated by reference.

BACKGROUND

Field of the Invention

The present invention relates to the field of organic lithium batteries having high energy and power densities. In particular, the present invention relates to an organic lithium battery comprising a positive electrode based on redox organic compounds and an electrolyte comprising a high concentration of lithium salt, and to its process of manufacture.

Description of Related Art

Lithium batteries have become essential constituents in numerous devices which comprise portable appliances, such as in particular mobile telephones, computers and lightweight equipment, or heavier appliances, such as two-wheel transportation means (bicycles, mopeds) or four-wheel transportation means (electric or hybrid motor vehicles). They are also widely studied for use in the field of stationary energy storage.

A lithium metal battery comprises at least one negative electrode and at least one positive electrode, between which is placed a separator impregnated with a liquid electrolyte or a solid polymer electrolyte providing by itself both the physical separation of the electrodes and the transportation of the lithium ions. The negative electrode consists of a sheet of lithium metal or of a lithium alloy, optionally supported by a current collector, and the positive electrode consists of a current collector supporting an electrode material containing at least one positive electrode active material capable of reversibly inserting lithium ions, optionally a polymer which acts as binder (e.g. poly(vinylidene fluoride) or PVDF) and/or optionally an agent generating an electron conductivity (e.g. carbon black). The liquid electrolyte for example consists of a lithium salt (e.g. $LiBF_4$, $LiClO_4$, $LiPF_6$, and the like) in solution in a solvent chosen in order to optimize the transportation and the dissociation of the ions. Conventional electrolyte solvents (e.g. propylene carbonate, γ-butyrolactone, sulpholane, dimethoxyethane, tetrahydrofuran, 1,3-dioxolane, and the like) are saturated under normal conditions at approximately 1-1.5 mol/l of lithium salt. The separator generally consists of a porous material which does not conduct electrons, for example a polymer material based on polyolefins (e.g. polyethylene) or on fibres (e.g. glass fibres or wood fibres).

During the operation of the battery, lithium ions pass from one to the other of the electrodes through the electrolyte. During discharging of the battery, an amount of lithium reacts with the positive electrode active material from the electrolyte and an equivalent amount is introduced into the electrolyte from the active material of the negative electrode, the concentration of lithium thus remaining constant in the electrolyte. The insertion of the lithium into the positive electrode is compensated for by supplying electrons from the negative electrode via an external circuit. During charging, the reverse phenomena take place.

The various constituents of a lithium battery are chosen so as to produce, at the lowest possible cost, batteries which have a high energy density, which have a good cycling stability and which operate with safety.

For historical reasons but also for reasons of electrochemical performance, the technologies currently commercialized are based on the virtually exclusive use of inorganic electrode materials, mainly based on transition metals, such as Co, Mn, Ni or Fe. However, these inorganic electrode materials (e.g. $LiCoO_2$, $LiMnO_4$, $LiFePO_4$, $LiNi_{0.8}Co_{0.15}Al_{0.05}O_2$, $LiNi_{1/3}Mn_{1/3}Co_{1/3}O_2$, $LiNi_{0.5}Mn_{1.5}O_4$, and the like) exhibit numerous disadvantages, such as the risk of explosion of the battery, their high toxicity, their difficulty of recycling, their high cost and/or their low specific capacity. In addition, these inorganic materials are generally prepared from resources of geological (i.e. non-renewable) origin and are energy consuming in their process. In view of the production volumes forecast for batteries (several billion units per year for the Li-ion technology), there is a risk of these inorganic electrode materials no longer being available in a large amount in the long run. Furthermore, none of the existing technologies fully meets requirements, while new environmental standards are appearing at the European level (see http://ec.europa.eu/environment/waste/batteries/, directive 2006/66/EC).

In this context, the development of organic lithium batteries comprising, as positive electrode active material, a redox organic structure (e.g. nitroxide derivatives, polyaromatic compounds), that is to say an organic structure capable of carrying out one or more reversible oxidation/reduction reactions, in particular by exchanging electrons with an electrode and simultaneously by combining with lithium ions, allows certain potentialities to be anticipated. First of all, these redox organic structures exhibit the advantage of comprising chemical elements (C, H, N, O, S, in particular) which can potentially derive from renewable resources, thus rendering them more plentiful. Subsequently, they are destroyed fairly easily by simple combustion at relatively moderate temperature. In addition, their electrochemical properties (ion and electron conduction properties, value of the oxidation potential, specific capacity) can be adjusted by appropriate functionalization (e.g. incorporation of attractive groups close to the redox centre). Finally, the redox organic structures generally have a relative density of the order of 1 $g/cm^3$; they are thus lighter than inorganic electoral materials and consequently result in lithium batteries exhibiting a reduced weight.

The studies carried out on organic lithium batteries since the start of the 80s have been exclusively centred on the search for novel redox organic structures and have shown that the fundamental properties required in order for a redox organic structure to be able to be employed as positive electrode active material are the electroactivity, the reversibility and a virtual insolubility in the electrolyte.

By way of example, π-conjugated conducting polymers, such as polypyrrole, polythiophene, polyaniline, polyacetylene or polyacryloxy(TEMPO) (with TEMPO: 2,2,6,6-tetramethylpiperidine-1-N-oxyl), have been used in lithium batteries as positive electrode material. However, these redox organic structures generally exhibit low specific capacities of the order of 100 mAh/g, in particular due to the fact that they do not make it possible to exchange more than 0.5 electron per monomer during the oxidation/reduction reactions.

The use of quinone derivatives as positive electrode active material, a quinone generally being characterized by two carbonyl functional groups present on an aromatic nucleus, has also aroused increasing interest. By way of example, 1,4-benzoquinone and 9,10-phenanthrenequinone (which exhibit two carbonyl functional groups) respectively have high theoretical specific capacities of the order of 500 mAh/g and 256 mAh/g. In addition, they can theoretically undergo a two-electron oxidation/reduction reaction. In particular, JPS5686466 discloses an organic lithium battery comprising a negative electrode consisting of lithium metal; a positive electrode comprising 9,10-phenanthrenequinone as active material; a liquid electrolyte consisting of $LiClO_4$ in solution in propylene carbonate; and a separator impregnated with said liquid electrolyte. The battery exhibits a good stability as regards its discharge capacity. However, the reversibility of the oxidation/reduction reactions is insufficient and the mean discharge voltage is relatively low (i.e. of the order of 2-2.5 volts). Similar results were obtained with anthraquinone.

Thus, quinones comprising a larger number of carbonyl functional groups (e.g. three or four carbonyl functional groups) have been proposed in order to improve the electrochemical performance of organic lithium batteries. For example, Yao et al. [*Int. J. of Electrochem. Sci.*, 2011, 6, 2905] have described an organic lithium battery comprising a negative electrode consisting of a sheet of lithium metal; a positive electrode consisting of a current collector made of aluminium supporting an electrode material comprising 5,7,12,14-pentacenetetrone (PT) as active material, acetylene black as agent generating an electron conductivity and polytetrafluoroethylene as binder; a liquid electrolyte consisting of lithium bis(trifluoromethanesulphonyl)imide (LiTFSI) as a 1 mol/l solution in γ-butyrolactone; and a separator made of glass fibres impregnated with said liquid electrolyte. However, the resistance to cycling of such a battery remains low since the initial specific capacity is of the order of 300 mAh/g and falls to 170 mAh/g after 10 cycles. This poor cycling stability is mainly related to the solubility of the positive electrode active material (PT) in the solvent of the liquid electrolyte (cf. γ-butyrolactone). This is because the majority of the redox organic structures of low molar mass (i.e. molar mass of less than 3000 g/mol) are soluble in the solvent of the liquid electrolyte. Consequently, when a redox organic structure is used as electrode active material, the electron conductivity between the current collector and said active material becomes insufficient and the reactivity is reduced. In addition, the concentration of active material which may be involved in an oxidation/reduction reaction is decreased, which brings about a fall in the capacity of the battery.

Other redox organic structures based on indolin-3-one, such as indigo dye, also known as indigotine or 2-(1,3-dihydro-3-oxo-2H-indole-2-ylidene)-1,2-dihydro-3H-indole-3-one, have also been proposed. In particular, Yao et al. [*Chem. Letters*, 2010, 39, 950] have described an organic lithium battery comprising a negative electrode consisting of a sheet of lithium metal; a positive electrode consisting of a current collector made of aluminium supporting an electrode material comprising indigotine as active material, acetylene black as agent generating an electron conductivity and polytetrafluoroethylene as binder; a liquid electrolyte consisting of lithium hexafluorophosphate ($LiPF_6$) as a 1 mol/l solution in a mixture of propylene carbonate and diethyl carbonate; and a separator impregnated with said liquid electrolyte. Here again, the specific capacity falls from 200 mAh/g to 20 mAh/g after approximately ten cycles, revealing a poor cycling stability.

In order to avoid the dissolution of the active material in the electrolyte, Patent Application EP 2 546 907 A1 describes the manufacture of an organic lithium battery comprising a negative electrode consisting of a sheet of lithium metal; a positive electrode consisting of a current collector made of aluminium supporting an electrode material comprising a redox organic structure of pyrene-4,5,9,10-tetraone type corresponding to the following formula (1):

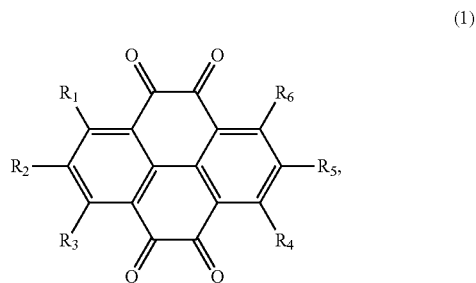

acetylene black as agent generating an electron conductivity and polytetrafluoroethylene as binder; a liquid electrolyte consisting of lithium hexafluorophosphate ($LiPF_6$) as a 1 mol/l solution in a mixture of ethylene carbonate and ethyl methyl carbonate; and a porous separator made of polyethylene impregnated with said liquid electrolyte. The performance of the organic lithium battery is improved in terms of resistance to cycling and of mean discharge voltage. However, the preparation of the redox organic structure corresponding to the formula (1) is complex (i.e. it comprises a large number of stages) and lengthy.

OBJECTS AND SUMMARY

Thus, the aim of the present invention is to overcome the disadvantages of the abovementioned prior art and to provide an economical organic lithium battery which employs relatively inexpensive, recyclable and non-toxic starting materials and which exhibits a good electrochemical performance, in particular in terms of resistance to cycling.

These aims are achieved by the invention which will be described below.

A first subject-matter of the invention is thus an organic lithium battery comprising:
  a negative electrode comprising lithium metal or an alloy of lithium metal,
  a positive electrode optionally supported by a current collector, said positive electrode comprising at least one redox organic structure comprising at least two carbonyl C=O functional groups, two thione C=S functional groups or two imine C=N functional groups, at least one polymer binder $P_1$ and at least one agent generating electron conductivity, said redox organic structure being different from the sulphur-comprising agents chosen from elemental sulphur $S_8$ and sulphur-comprising organic compounds comprising at least one S—S bond,
  said organic lithium battery being characterized in that it additionally comprises an electrolyte comprising at least one lithium salt $L_1$ and at least one liquid linear or cyclic polyether with a molar mass of less than or equal to 10 000 g·mol$^{-1}$ approximately, it being understood that:

when the electrolyte is a liquid electrolyte, the concentration of lithium salt $L_1$ in said liquid electrolyte is at least 1.6 mol/l approximately, and the liquid electrolyte impregnates a porous separator, and when the electrolyte is a gelled polymer electrolyte, it additionally comprises at least one polymer binder $P_2$ which is soluble in the liquid linear or cyclic polyether with a molar mass of less than or equal to 10 000 g·mol$^{-1}$ approximately, and the concentration of lithium salt $L_1$ in said gelled polymer electrolyte is such that the O/Li ratio is at most 15 approximately, it being understood that, in the O/Li ratio, "0" denotes the number of oxygen atoms provided by the ether units of the liquid linear or cyclic polyether with a molar mass of less than or equal to 10 000 g·mol$^{-1}$ approximately, and optionally by the ether units of the polymer binder $P_2$, if it contains them, and "$L_1$" denotes the number of lithium ions provided by the lithium salt $L_1$.

The inventors of the present patent application have thus discovered that the use of a high concentration of lithium salt in combination with the presence of a liquid linear or cyclic polyether with a molecular weight of less than or equal to 10 000 g·mol$^{-1}$ approximately in the electrolyte of the organic lithium battery make it possible to significantly improve the electrochemical performance of said battery, in particular in terms of stability of the specific capacity during the discharging over a large number of cycles. This is entirely surprising in so far as an increase in the concentration of lithium salt in a conventional electrolyte is generally accompanied by a fall in ion conductivity, by an increase in the viscosity and by a decrease in the mobility of the lithium ions, bringing about a decrease in the specific capacity and a limitation with regard to the current rate which can be used.

By virtue of the use of such an electrolyte, the dissolution and the diffusion of the redox organic structure of the positive electrode in the battery are greatly restricted.

In addition, the organic lithium battery of the invention exhibits the advantage of being able to be employed with various redox organic structures without, however, having to modify their structures, in particular by addition of new functional groups.

The liquid linear or cyclic polyether is preferably a liquid linear or cyclic polyether with a molar mass of less than or equal to 2000 g·mol$^{-1}$ approximately, and more preferably of less than or equal to 600 g·mol$^{-1}$ approximately.

The liquid polyether is preferably linear.

Said liquid linear or cyclic polyether of the electrolyte of the battery of the invention can be chosen from:

polyethylene glycols of formula H—[O—CH$_2$—CH$_2$]$_m$—OH in which m is between 1 and 13, glycol ethers of formula R—[O—CH$_2$—CH$_2$]$_p$—O—R' in which p is between 1 and 13 and R and R', identical or different, are linear, branched or cyclic alkyl groups which can comprise from 1 to 20 carbon atoms, ethers of formula R$^1$—[CH$_2$—O]$_q$—R$^{1'}$ in which q is between 1 and 13 and R$^1$ and R$^{1'}$, identical or different, are linear, branched or cyclic alkyl groups which can comprise from 1 to 20 carbon atoms and optionally heteroatoms, cyclic ethers which can comprise from 2 to 20 carbon atoms, cyclic polyethers which can comprise from 3 to 40 carbon atoms, and one of their mixtures.

The polyether(s) used in the electrolyte of the invention is (are) particularly stable with regard to lithium and redox organic structures, thus making it possible to limit side reactions as much as possible.

In a preferred embodiment, the liquid linear or cyclic polyether is tetraethylene glycol dimethyl ether (TEGDME) of formula CH$_3$O—(CH$_2$—CH$_2$)$_4$—OCH$_3$ (i.e. R and R'=CH$_3$ and p=4) or tetraethylene glycol (TEG) of formula H—(O—CH$_2$—CH$_2$)$_4$—OH (i.e. m=4).

The lithium salt $L_1$ can be chosen from lithium fluorate (LiFO$_3$), lithium bis(trifluoromethanesulphonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis(fluorosulphonyl)imide (LiFSI), lithium bis(oxalato)borate (LiB(C$_2$O$_4$)$_2$ or LiBOB) and their mixtures.

LiTFSI is the preferred lithium salt $L_1$.

It is obvious that the electrolyte of the battery of the invention is non-aqueous, that is to say that it thus does not comprise water or aqueous solvents. This is because an aqueous electrolyte is not compatible with a negative electrode made of lithium metal.

The electrolyte preferably does not comprise organic solvents of carbonate type, the latter being unstable in the presence of a lithium electrode in the long term and resulting in the consumption of the latter by the formation of a lithium foam.

According to a first alternative form, the electrolyte is a liquid electrolyte. It then completely saturates the porous separator in order to impregnate the porosity thereof.

The choice of the porous separator is not limiting and the latter is well known to a person skilled in the art.

The porous separator can be made of a porous material which does not conduct electrons and is generally made of a polymer material based on polyolefin (e.g. polyethylene) or made of fibres (e.g. glass fibres or wood fibres).

According to this first alternative form, the concentration of the lithium salt $L_1$ in the liquid electrolyte ranges from 1.6 to 8 mol/l approximately, preferably from 1.8 to 6 mol/l approximately and more preferably from 2.1 to 5 mol/l approximately.

The liquid electrolyte can consist of a lithium salt $L_1$ in solution in a solvent comprising at least one liquid linear or cyclic polyether.

The liquid electrolyte can consist solely of a lithium salt $L_1$ and of a liquid linear or cyclic polyether.

The liquid electrolyte is preferably a solution comprising 4.5 mol/l of LiTFSI in TEGDME.

According to a second alternative form, the electrolyte is a gelled polymer electrolyte.

The O/Li ratio of the gelled polymer electrolyte can range from 2 to 15 approximately, preferably from 3 to 10 approximately and more preferably from 4 to 8 approximately.

The polymer binder $P_2$ of the gelled polymer electrolyte has to be soluble in the liquid polyether.

The polymer binder $P_2$ can make it possible to dissolve the lithium salt $L_1$ present in a high concentration in the gelled polymer electrolyte and to provide the mechanical strength of said gelled polymer electrolyte. The gelled polymer electrolyte can then be used alone, that is to say without porous separator, and thus form a self-supported dry electrolyte film.

The polymer binder $P_2$ of the gelled polymer electrolyte can be chosen from:

polyolefins, such as homopolymers or copolymers of ethylene or homopolymers or copolymers of propylene (e.g. copolymer of ethylene and propylene);

polymers comprising several ether units, such as polyethers, polyetherimides or polyvinyl ethers;

halogenated polymers, such as homopolymers or copolymers of vinyl chloride, of vinylidene fluoride (PVDF), of vinylidene chloride, of tetrafluoroethylene or of chlorotrifluoroethylene or copolymers of vinylidene fluoride and of hexafluoropropylene (PVDF-co-HFP);

non-electron-conducting polymers of anionic type, such as poly(styrenesulphonate), poly(acrylic acid), poly(glutamate), alginate, gelatin or pectin;

polyacrylates;

elastomers, such as homopolymers or copolymers of ethylene, of propylene, of styrene, of butadiene or of chloroprene; and one of their mixtures.

Copolymer is understood to mean, in the present text, a polymer compound obtained from at least two different monomers.

The polymer binder $P_2$ can have a molar mass strictly greater than 10 000 g·mol$^{-1}$ approximately, preferably of strictly greater than 50 000 g·mol$^{-1}$ approximately, and more preferably of strictly greater than 100 000 g·mol$^{-1}$ approximately.

The polyethers can exhibit a linear, comb or block structure.

Mention may be made, as examples of polyethers, of homopolymers or copolymers of ethylene oxide (e.g. PEO, copolymer of PEO), of methylene oxide, of propylene oxide, of epichlorohydrin or of allyl glycidyl ether.

The gelled polymer electrolyte can comprise from 40 to 80% by weight approximately of polymer binder $P_2$ and preferably from 50 to 70% by weight approximately of polymer binder $P_2$, with respect to the total weight of the gelled polymer electrolyte.

According to a particularly preferred embodiment of the invention, the polymer binder $P_2$ is a mixture of a polymer $P_{2-A}$ and of a polymer $P_{2-B}$, said polymer $P_{2-A}$ making it possible to dissolve the lithium salt $L_1$ present in a high concentration in the gelled polymer electrolyte and said polymer $P_{2-B}$ making it possible to provide the mechanical strength of said gelled polymer electrolyte.

It is sufficient for any one of the polymers $P_{2-A}$ or $P_{2-B}$ to be soluble in the liquid linear or cyclic polyether with a molar mass of less than or equal to 10 000 g·mol$^{-1}$ approximately.

Preferably, both polymers $P_{2-A}$ and $P_{2-B}$ are soluble in the liquid linear or cyclic polyether with a molar mass of less than or equal to 10 000 g·mol$^{-1}$ approximately.

The polymer $P_{2-A}$ can be a polymer comprising several ether units as defined above.

The polymer $P_{2-B}$ can be a halogenated polymer as defined above.

The gelled polymer electrolyte can comprise from 5 to 30% by weight approximately of polymer $P_{2-A}$ and preferably from 10 to 25% by weight approximately of polymer $P_{2-A}$, with respect to the total weight of the gelled polymer electrolyte.

The preferred polymers $P_{2-A}$ are the copolymer of ethylene oxide and of propylene oxide and the copolymer of ethylene oxide and of butylene oxide.

The gelled polymer electrolyte can comprise from 20 to 50% by weight approximately of polymer $P_{2-B}$ and preferably from 30 to 45% by weight approximately of polymer $P_{2-B}$, with respect to the total weight of the gelled polymer electrolyte.

The preferred polymers $P_{2-B}$ are polyvinylidene fluoride (PVDF) and the copolymer of vinylidene fluoride and of hexafluoropropylene (PVDF-co-HFP).

The gelled polymer electrolyte can comprise from 18 to 50% by weight approximately of lithium salt $L_1$, more preferably from 25 to 50% by weight approximately of lithium salt $L_1$ and more preferably from 30 to 45% by weight approximately of lithium salt $L_1$, with respect to the total weight of the gelled polymer electrolyte.

The gelled polymer electrolyte can comprise from 1 to 35% by weight approximately of liquid linear or cyclic polyether, preferably from 2 to 30% by weight approximately of liquid linear or cyclic polyether and more preferably from 2 to 15% by weight approximately of liquid linear or cyclic polyether, with respect to the total weight of the gelled polymer electrolyte.

The battery in accordance with the invention can operate between 0 and 110° C. approximately and preferably between 20 and 100° C. approximately.

In a specific embodiment of the invention, the positive electrode of the battery of the invention comprises at least 50% by weight approximately of redox organic structure and preferably at least 65% by weight approximately of redox organic structure, with respect to the total weight of said positive electrode.

In the present invention, the expression "redox organic structure" means an electroactive organic structure capable of reversibly reacting with lithium, that is to say an organic structure capable of carrying out one or more reversible oxidation/reduction reactions, by exchanging electrons with an electrode and by simultaneously combining with lithium ions.

The redox organic structure represents the active material of the positive electrode (i.e. the positive electrode material) of the organic lithium battery of the invention.

In the present invention, the redox organic structure being different from the sulphur-comprising agents chosen from elemental sulphur $S_8$ and sulphur-comprising organic compounds comprising at least one S—S bond, it is not a positive electrode active material such as those generally used as positive electrode active material of a lithium-sulphur battery. The sulphur-comprising organic compounds comprising at least one S—S bond can be organic polysulphides, in particular those of general formula $R^2$—S—S$_n$—$R^3$ in which $R^2$ and $R^3$, which are identical or different, represent a linear, branched or cyclic alkyl chain which can comprise from 1 to 20 carbon atoms, n being between 1 and 50; or disulphide polymers exhibiting a sequence of S—S bonds which can be broken during the discharging cycle of a lithium-sulphur battery and reformed during the charging cycle. The sulphur-comprising organic compounds comprising at least one S—S bond can also be the compounds of formula Li$_2$S$_w$ in which w>1 or the carbon-sulphur polymers of formula $(C_2S_{x1})_{y1}$ in which $x_1$=2.5–50 and $y_1$≥2.

The redox organic structure can be different from Li$_2$S, which corresponds to the discharged state of the compounds of formula Li$_2$S$_w$ as defined above.

The redox organic structure comprises at least two carbonyl C=O functional groups, two thione C=S functional groups or two imine C=N functional groups, optionally present on at least one aromatic nucleus. The carbonyl functional groups are preferred.

According to a particularly preferred form of the invention, the redox organic structure belongs to any one of the following families: the quinones, the anthraquinones, the benzoquinones, the naphthoquinones, the oxo-indolylidenes, the compounds derived from the $C_6O_6$ backbone (i.e. rhodizonate derivatives), the compounds comprising at least one tetracyclic pyracene and the compounds derived from the calix[4]arene backbone.

The redox organic structure comprising at least two thione C=S functional groups can be chosen from the sulphur-comprising equivalents of these compounds, for example the cyclohexadienedithiones, the compounds derived from the $C_2S_2(C_6H_4)_2$ backbone, the thio-indolylidenes and the derivatives of the $C_6O_nS_{6-n}$ backbone.

The positive electrode can comprise from 1 to 30% by weight approximately and preferably from 2 to 20% by weight approximately of agent generating an electron conductivity, with respect to the total weight of the positive electrode.

The agent generating an electron conductivity suitable for the present invention is preferably chosen from carbon black, sp carbon, acetylene black, carbon fibres and nanofibres, carbon nanotubes, graphene, graphite, metal particles and fibres, and one of their mixtures.

The agent generating an electron conductivity is preferably carbon black.

Preferably, the agent generating an electron conductivity is in the form of spherical particles (i.e. in the form of beads) in order to promote the conduction, in particular in the direction perpendicular to the positive electrode (i.e. in the direction of its thickness), and thus to promote the electrochemical processes within the electrode. This is because the particles of agent generating an electron conductivity in the spherical form have a propensity to form three-dimensional conducting networks.

Mention may be made, as example of carbon black, of the carbon blacks sold under the references: Ketjenblack 600JD®, Ketjenblack 700JD® and Timcal Ensaco 350G®.

According to a specific embodiment, the positive electrode comprises from 2 to 30% by weight approximately of polymer binder $P_1$ and preferably from 5 to 20% by weight approximately of polymer binder $P_1$, with respect to the total weight of the positive electrode.

The polymer binder $P_1$ can be chosen from copolymers and homopolymers of ethylene; copolymers and homopolymers of propylene; homopolymers and copolymers of ethylene oxide (e.g. PEO, copolymer of PEO), of methylene oxide, of propylene oxide, of epichlorohydrin or of allyl glycidyl ether, and their mixtures; halogenated polymers, such as homopolymers and copolymers of vinyl chloride, of vinylidene fluoride (PVDF), of vinylidene chloride, of tetrafluoroethylene or of chlorotrifluoroethylene, copolymers of vinylidene fluoride and of hexafluoropropylene (PVDF-co-HFP) or their mixtures; polyacrylates, such as polymethyl methacrylate; polyalcohols, such as polyvinyl alcohol (PVA); electron-conducting polymers, such as polyaniline, polypyrrole, polyfluorenes, polypyrenes, polyazulenes, polynaphthalenes, polyacetylenes, poly(p-phenylene-vinylene), polycarbazoles, polyindoles, polyazepines, polythiophenes, poly(p-phenylene sulphide) or their mixtures; polymers of cationic type, such as polyethyleneimine (PEI), polyaniline in the emeraldine salt (ES) form, poly(quaternized N-vinylimidazole), poly(acrylamide-co-diallyldimethylammonium chloride) (AMAC) or their mixtures; and one of their mixtures.

The polymer binder $P_1$ is preferably a copolymer of PEO or a copolymer of vinylidene fluoride and of hexafluoropropylene.

The positive electrode can additionally comprise at least one liquid linear or cyclic polyether as defined in the present invention. The presence of the liquid linear or cyclic polyether in the positive electrode makes it possible to improve its ion conductivity.

The positive electrode can then comprise from 2 to 30% by weight approximately of liquid linear or cyclic polyether and preferably from 8 to 20% by weight approximately of liquid linear or cyclic polyether, with respect to the total weight of the positive electrode.

The positive electrode can additionally comprise at least one lithium salt $L_2$.

The positive electrode can then comprise from 1 to 25% by weight approximately of lithium salt $L_2$, preferably from 1 to 15% by weight approximately of lithium salt $L_2$ and more preferably from 1 to 10% by weight approximately of lithium salt $L_2$, with respect to the total weight of the positive electrode.

The lithium salt $L_2$ can be chosen from lithium fluorate ($LiFO_3$), lithium bis(trifluoromethanesulphonyl)imide (LiTFSI), lithium hexafluorophosphate ($LiPF_6$), lithium fluoroborate ($LiBF_4$), lithium metaborate ($LiBO_2$), lithium perchlorate ($LiClO_4$), lithium nitrate ($LiNO_3$), lithium bis(fluorosulphonyl)imide (LiFSI), lithium bis(oxalato)borate ($LiB(C_2O_4)_2$ or LiBOB) and their mixtures.

LiTFSI is the preferred lithium salt $L_2$.

The positive electrode of the invention can exhibit a porosity of less than or equal to 40% by volume approximately and preferably of less than or equal to 30% by volume approximately, with respect to the total volume of the positive electrode. This thus makes it possible to improve the energy density of the battery.

It should be noted that the total weight of the positive electrode comprises the weight of the redox organic structure, the weight of the polymer binder $P_1$, the weight of the agent generating an electron conductivity, optionally the weight of the liquid linear or cyclic polyether, if it is present, and optionally the weight of the lithium salt $L_2$, if it is present.

The positive electrode can be prepared:

a) by mixing at least one redox organic structure with at least one agent generating an electron conductivity, at least one polymer binder $P_1$, optionally at least one lithium salt $L_2$, optionally at least one liquid linear or cyclic polyether and optionally at least one solvent of said polymer binder $P_1$, in order to obtain an electrode paste, b) by applying said electrode paste to at least one support, c) by drying said electrode paste in order to obtain a positive electrode in the form of a supported film.

The polymer binder $P_1$, the lithium salt $L_2$ and the liquid linear or cyclic polyether are as defined in the present invention.

Stage a) can be carried out by extrusion or by grinding.

Extrusion is highly advantageous since it makes it possible to easily obtain electrodes of low porosity while not using much solvent. It also makes it possible to avoid a stage of calendering on the dry electrode, which can cause structural modifications of the electrode and harm the quality of the electron percolating network. Finally, the calendering stage exhibits the disadvantage of increasing the number of stages in order to obtain the electrode and thus its production cost.

The solvent of the polymer binder $P_1$ of stage a) makes it possible to dissolve said polymer binder $P_1$.

When it is present, said solvent preferably represents less than 30% by weight approximately of the total weight of the mixture of the redox organic structure, of agent generating an electron conductivity, of polymer binder $P_1$, optionally of lithium salt $L_2$ and optionally of liquid linear or cyclic polyether.

The use during the manufacture of the positive electrode of a small amount of solvent of the polymer binder $P_1$ makes it possible to result in a positive electrode of low porosity (i.e. ≤40% by volume approximately). This low porosity makes it possible to control and to optimize the amount of redox organic structure present in the positive electrode and thus to arrive at optimum energy densities by volume.

The solvent of stage a) can be chosen from water, N-methylpyrrolidone, solvents of carbonate type, such as ethylene carbonate, propylene carbonate, dimethyl carbonate, diethyl carbonate or ethyl methyl carbonate, acetone, alcohols, such as methanol, ethanol or propanol, and their mixtures.

The solvent is preferably chosen from water, acetone, alcohols and their mixtures.

Stage b) can be carried out by laminating or by coating.

The support can be a current collector and/or a support film.

Mention may be made, as example of current collector, of a current collector made of aluminium covered with a carbon-based layer (corrosion-resistant layer).

Mention may be made, as example of support film, of a plastic film of silicone-treated polyethylene terephthalate (PET) type.

The positive electrode supported film obtained on conclusion of stage c) can have a thickness ranging from 2 to 100 μm approximately and preferably from 10 to 60 μm approximately.

Stage c) can be carried out at a temperature sufficient to make it possible to remove the solvent of stage a).

A second subject-matter of the invention is a process for the manufacture of an organic lithium battery as defined in the first subject-matter of the invention, characterized in that it comprises the following stages:

A) a stage of preparation of a liquid electrolyte or of a gelled polymer electrolyte as defined in the present invention, in particular by mixing at least one liquid linear or cyclic polyether with at least one lithium salt $L_1$, said process additionally comprising one or other of the following sequences B1 or B2:

B1) a stage of assembling a positive electrode, a negative electrode, as are defined in the present invention, and a gelled polymer electrolyte prepared in stage A), or B2-i) a stage of assembling a positive electrode, a negative electrode and a porous separator, as are defined in the present invention, and B2-ii) a stage of impregnation of the assembly as obtained in stage B2-i) by the liquid electrolyte prepared in stage A).

The liquid linear or cyclic polyether, the lithium salt $L_1$ and the polymer binder $P_2$ are as defined in the first subject-matter of the invention.

The liquid electrolyte of stage A) is preferably prepared by dissolving, with stirring, at least one lithium salt $L_1$ in a liquid linear or cyclic polyether, optionally at a temperature ranging from 20 to 120° C. approximately.

The gelled polymer electrolyte of stage A) can be obtained by extrusion of at least one polymer binder $P_2$ with a solution comprising at least one liquid linear or cyclic polyether and at least one lithium salt $L_1$, in order to obtain an electrolyte paste, and then by laminating the electrolyte paste, in particular between two support films, in order to obtain a gelled polymer electrolyte film.

The extrusion can be carried out at a temperature ranging from 60 to 170° C. approximately.

The two support films can be plastic films of silicone-treated PET.

The present invention is illustrated by the examples below, to which, however, it is not limited.

DETAILED DESCRIPTION

Examples

Figure 1:
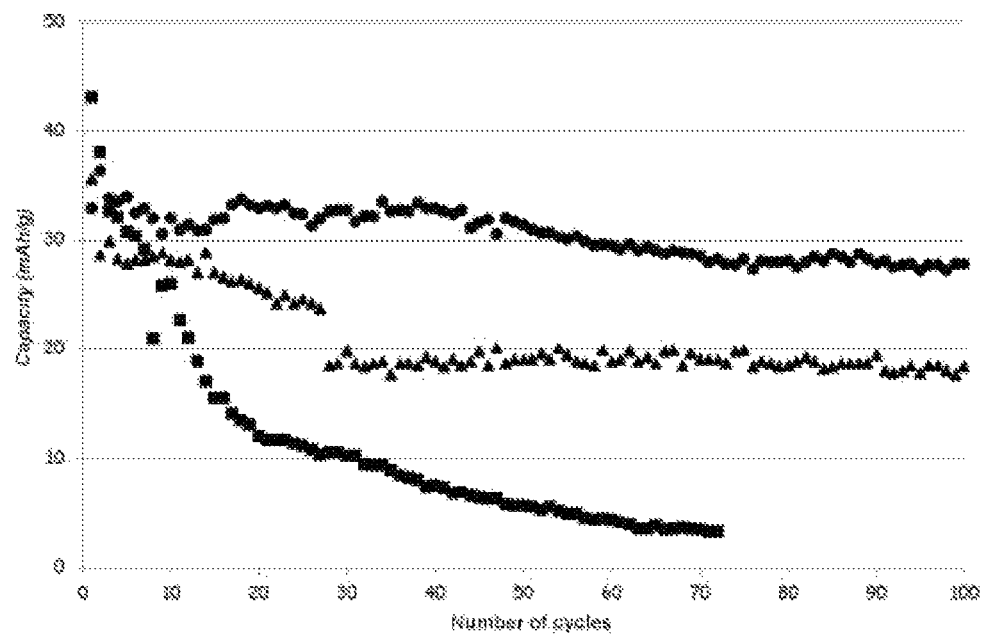
FIG. 1 is a graph from example 1 of the specific capacity (in mAh/g) of the battery B-1 (curve with the solid circles), of the battery B-2 (curve with the solid triangles) and of the battery B-3 (curve with the solid squares) as a function of the number of cycles at a current rate of C/10 and at a temperature of 100° C.

The starting materials used in the examples are listed below:

Ketjenblack 600JD® carbon black, AkzoNobel,

Indigotine, 2-(1,3-dihydro-3-oxo-2H-indole-2-ylidene)-1, 2-dihydro-3H-indole-3-one, with a purity of 95%, Sigma Aldrich, Copolymer of PEO (co-PEO), Mw~$10^5$ g·mol$^{-1}$, ZSN 8100, Zeospan, Copolymer of vinylidene fluoride and of hexafluoropropylene (PVDF-co-HFP), Mw=6·$10^5$ g·mol$^{-1}$, Solex, Solvay, LiTFSI, 3M, Silicone-treated PET film, Mitsubishi, Tetraethylene glycol dimethyl ether (TEGDME) with a purity of 99%, Sigma Aldrich, Monolayer separator made of polypropylene, Celgard 2500, N-Methylpyrrolidone (NMP), with a purity of 99.5%, Sigma Aldrich.

Unless otherwise indicated, all the materials were used as received from the manufacturers.

Example 1

Manufacture of Batteries B-1, B-2 and B-3

1.1 Preparation of the Positive Electrode 3 g of Ketjenblack carbon black, 21 g of indigotine, 4.8 g of copolymer of co-PEO, 1.2 g of lithium salt (LiTFSI) and 5 g of water were mixed at 80° C. for 20 minutes in a mixer sold under the trade name Plastograph® EC by Brabender®. The amount of water used represented 16.6% by weight approximately of the total weight of the carbon black, of the indigotine, of the copolymer of co-PEO and of the lithium salt LiTFSI.

The paste thus obtained was subsequently laminated at 95° C. on a current collector made of aluminium covered with a carbon-based layer.

The film thus obtained was dried at 110° C. for 20 minutes in an oven in order to obtain a positive electrode E-1 in the form of a film in accordance with the invention.

The composition by weight of the positive electrode E-1 obtained is presented in Table 1 below:

TABLE 1

| Positive electrode | Carbon black (%) | Lithium salt (%) | Co-PEO (%) | Indigo (%) |
|---|---|---|---|---|
| E-1 | 10 | 4 | 16 | 70 |

1.2 Preparation of Gelled Polymer Electrolytes

Lithium salt (LiTFSI) was dissolved in TEGDME under magnetic stirring at 50° C. A copolymer of PEO Zeospan® and a copolymer of vinylidene fluoride and of hexafluoropropylene (PVDF-co-HFP) were then added to the mixture obtained. The resulting mixture was kneaded in the Plastograph® EC mixer as described in Example 1.1, at 130° C. for 40 minutes. The electrolyte paste obtained was laminated at 125° C. between two plastic films of silicone-treated PET.

The composition by weight of two gelled polymer electrolytes obtained are presented in Table 2 below:

TABLE 2

| Gelled polymer electrolyte | TEGDME (%) | Lithium salt (%) | Co-PEO (%) | PVDF-co-HFP (%) | O/Li Ratio |
|---|---|---|---|---|---|
| PG-1 | 6 | 39 | 20 | 35 | 4 |
| PG-2 | 24.7 | 13.3 | 22 | 40 | 22 |

1.3 Preparation of a Solid Polymer Electrolyte

The solid polymer electrolyte was prepared by extrusion of a mixture of lithium salt (LiTFSI), of copolymer of PEO Zeospan® and of PVDF-co-HFP, and then by laminating the electrolyte paste obtained at 125° C. between two plastic films of silicone-treated PET.

The composition by weight of the solid polymer electrolyte obtained is presented in Table 3 below:

TABLE 3

| Solid polymer electrolyte | TEGDME (%) | Lithium salt (%) | Co-PEO (%) | PVDF-co-HFP (%) |
|---|---|---|---|---|
| SP-1 | 0 | 12 | 48 | 40 |

The solid polymer electrolyte not in accordance with the invention and as prepared above comprises a concentration of lithium salt such that the O/Li ratio of the number of oxygen atoms provided by the ether units of the co-PEO to the number of lithium ions provided by the lithium salt is 22.

1.4 Manufacture of Organic Lithium Batteries

Three batteries B-1, B-2 and B-3 were prepared by assembling, under an anhydrous atmosphere (air with a dew point <−40° C.), by manual laminating at ambient temperature:
- the positive electrode E-1 obtained in Example 1.1 above,
- a negative electrode comprising lithium metal in the form of a film of lithium metal with a thickness of approximately 100 µm, and
- the gelled polymer electrolyte PG-1 obtained in Example 1.2 above, or the gelled polymer electrolyte PG-2 obtained in Example 1.2 above, or the solid polymer electrolyte SP-1 obtained in Example 1.3 above.

The battery B-1 is in accordance with the invention since it comprises a positive electrode, a negative electrode and a gelled polymer electrolyte as are defined in the present invention.

On the other hand, the batteries B-2 and B-3 are not in accordance with the invention since they do not comprise a liquid electrolyte or gelled polymer electrolyte as defined in the present invention.

The specific capacity (in mAh/g) of the battery B-1 (curve with the solid circles), of the battery B-2 (curve with the solid triangles) and of the battery B-3 (curve with the solid squares) as a function of the number of cycles at a current rate of C/10 and at a temperature of 100° C. is given in FIG. 1.

These results show that the use of a gelled polymer electrolyte as defined in the present invention makes it possible to retain an initial specific capacity of the same order of magnitude as those obtained with a solid polymer electrolyte (battery B-3) in organic lithium batteries.

Figure 2:
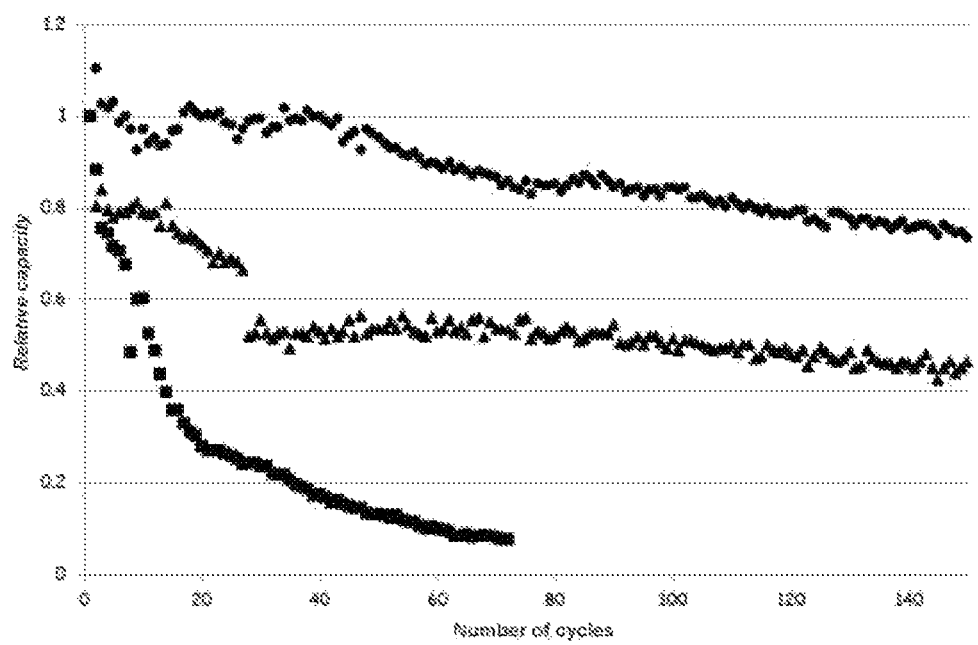
FIG. 2 is a graph from example 1 of the relative capacity, corresponding to the ratio of the discharge capacity of the n cycle to the discharge capacity of the first cycle, of the batteries B-1 (curve with the solid circles), B-2 (curve with the solid triangles) and B-3 (curve with the solid squares) as a function of the number of cycles at a current rate of C/10 and a temperature of 100° C.

The relative capacity, corresponding to the ratio of the discharge capacity of the n cycle to the discharge capacity of the first cycle, of the batteries B-1 (curve with the solid circles), B-2 (curve with the solid triangles) and B-3 (curve with the solid squares) as a function of the number of cycles at a current rate of C/10 and a temperature of 100° C. is given in FIG. 2.

In particular, FIG. 2 shows, for the battery B-3 (solid polymer electrolyte), a very rapid fall in the discharge capacity during the first cycles and the absence of stabilization in the subsequent cycles, probably related to a dissolution of the indigotine in the solid polymer electrolyte and thus its diffusion. On the other hand, the use of a gelled polymer electrolyte as defined in the present invention makes it possible to significantly improve the cyclability of the organic lithium battery.

The use of a solid polymer electrolyte exhibiting a concentration of lithium salt such that the O/Li ratio of the number of oxygen atoms provided by the ether units of the co-PEO to the number of lithium ions provided by the lithium salt is greater than 15 is not appropriate either since it would generate a significant increase in the viscosity of the electrolyte and thus a significant lowering of the capacity restored and thus of the energy density.

Example 2

Manufacture of Batteries B-4 and B-5

2.1 Preparation of the Positive Electrode 1.75 g of Ketjenblack carbon black, 24.5 g of indigotine, 4.53 g of TEGDME, 1.42 g of lithium salt (LiTFSI), 2.8 g of PVDF-co-HFP polymer and 5 g of N-methylpyrrolidone (NMP) were mixed at 120° C. for 20 minutes in a mixer sold under the trade name Plastograph® EC by Brabender®. The amount of NMP used represented 14% by weight approximately of the total weight of the carbon black, of the indigotine, of the TEGDME, of the lithium salt LiTFSI and of the PVDF-co-HFP.

The paste thus obtained was subsequently laminated at 80° C. on a current collector made of aluminium covered with a carbon-based layer.

The film thus obtained was dried at 110° C. for 20 minutes in an oven in order to obtain a positive electrode E-2 in the form of a film in accordance with the invention.

The composition by weight of the positive electrode E-2 obtained is presented in Table 4 below:

TABLE 4

| Positive electrode | Carbon black (%) | Lithium salt (%) | TEGDME (%) | PVDF-co-HFP (%) | Indigo (%) |
|---|---|---|---|---|---|
| E-2 | 5 | 4.06 | 12.94 | 8 | 70 |

2.2 Preparation of Two Liquid Electrolytes

Two liquid electrolytes L-1 and L-2 were prepared by dissolution of a lithium salt LiTFSI in TEGDME under magnetic stirring at 50° C. for 10 min. The liquid electrolyte L-1 in accordance with the invention exhibited a concentration of lithium salt equal to 2.27 mol/l. The liquid electrolyte L-2 not in accordance with the invention exhibited a concentration of 0.9 mol/l.

2.3 Manufacture of Organic Lithium Batteries

Two batteries B-4 and B-5 were prepared by assembling, under an anhydrous atmosphere (air with a dew point <−40° C.), by manual laminating at ambient temperature:
- the positive electrode E-2 obtained in Example 2.1 above,
- a negative electrode comprising lithium metal in the form of a film of lithium metal with a thickness of approximately 100 μm, and
- a Celgard 2500 separator impregnated with the liquid electrolyte L-1 obtained in Example 2.2 above, or a Celgard 2500 separator impregnated with the liquid electrolyte L-2 obtained in Example 2.2 above.

Figure 3:
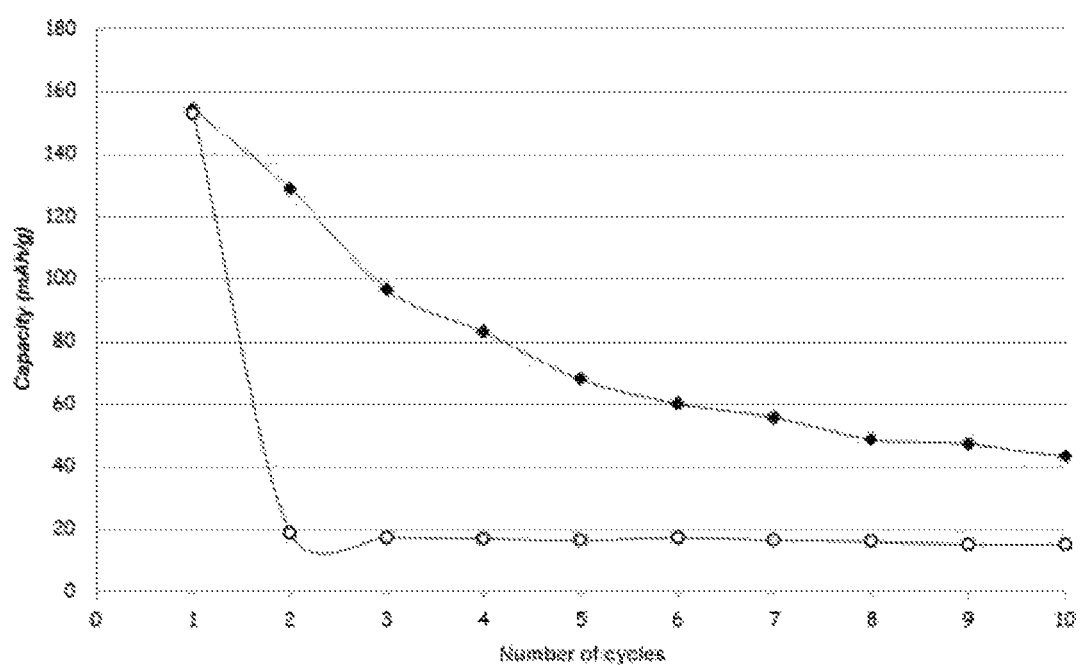
FIG. 3 is a graph from example 2 showing the specific capacity (in mAh/g) of the battery B-4 (curve with the solid black diamonds) and of the battery B-5 (curve with the empty circles) as a function of the number of cycles at a current rate of C/20-D/20 (a charging or a discharging in 20 hours) and at a temperature of 40° C.

The specific capacity (in mAh/g) of the battery B-4 (curve with the solid black diamonds) and of the battery B-5 (curve with the empty circles) as a function of the number of cycles at a current rate of C/20-D/20 (a charging or a discharging in 20 hours) and at a temperature of 40° C. is given in FIG. 3.

This FIG. 3 demonstrates a slower fall in the discharge capacity for the battery B-4 in accordance with the invention (curve with the solid black diamonds), which attests to the effectiveness of a high content of lithium salt in slowing down the diffusion of the active material in the liquid electrolyte.

The invention claimed is:

1. Organic lithium battery comprising:
   a negative electrode comprising lithium metal or an alloy of lithium metal,
   a positive electrode optionally supported by a current collector, said positive electrode comprising at least one redox organic structure comprising at least two carbonyl C=O functional groups, two thione C=S functional groups or two imine C=N functional groups, at least one polymer binder $P_1$ and at least one agent generating electron conductivity, said redox organic structure being different from sulphur-comprising agents chosen from elemental sulphur $S_8$ and sulphur-comprising organic compounds comprising at least one S—S bond,
   said organic lithium battery being characterized in that it additionally comprises an electrolyte comprising at least one lithium salt $L_1$ and at least one liquid linear or cyclic polyether with a molar mass of less than or equal to 10 000 g·mol$^{-1}$, wherein:
   the electrolyte is a gelled polymer electrolyte, it additionally comprises at least one polymer binder $P_2$ which is soluble in the liquid linear or cyclic polyether with a molar mass of less than or equal to 10 000 g·mol$^{-1}$, and the concentration of lithium salt $L_1$ in said gelled polymer electrolyte is such that the O/Li ratio is at most 15, it being understood that, in the O/Li ratio, "O" denotes the number of oxygen atoms provided by the ether units of the liquid linear or cyclic polyether with a molar mass of less than or equal to 10 000 g·mol$^{-1}$, and optionally by the ether units of the polymer binder $P_2$, if it contains them, and "Li" denotes the number of lithium ions provided by the lithium salt $L_1$, and
   wherein the positive electrode comprises at least 50% by weight of said redox organic structure, with respect to the total weight of said positive electrode.

2. Battery according to claim 1, wherein the lithium salt Li is chosen from lithium fluorate (LiFO$_3$), lithium bis(trifluoromethanesulphonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis(fluorosulphonyl)imide (LiFSI), lithium bis(oxalato)borate (LiB(C$_2$O$_4$)$_2$ or LiBOB) and their mixtures.

3. Battery according to claim 1, wherein the positive electrode comprises from 1 to 30% by weight of agent generating an electron conductivity, with respect to the total weight of the positive electrode.

4. Battery according to claim 1, wherein the agent generating an electron conductivity is chosen from carbon black, sp carbon, acetylene black, carbon fibres and nanofibres, carbon nanotubes, graphene, graphite, metal particles and fibres, and one of their mixtures.

5. Battery according to claim 1, wherein the positive electrode comprises from 2 to 30% by weight of polymer binder $P_1$, with respect to the total weight of the positive electrode.

6. Battery according to claim 1, wherein the polymer binder $P_1$ is chosen from copolymers and homopolymers of ethylene; copolymers and homopolymers of propylene; homopolymers and copolymers of ethylene oxide, of methylene oxide, of propylene oxide, of epichlorohydrin or of allyl glycidyl ether, and their mixtures; halogenated polymers; polyacrylates; polyalcohols; electron-conducting polymers; polymers of cationic type; and one of their mixtures.

7. Battery according to claim 1, wherein the polymer binder $P_2$ is chosen from polyolefins, polymers comprising several ether units, halogenated polymers, non-electron-conducting polymers of anionic type, polyacrylates, elastomers and one of their mixtures.

8. Battery according to claim 1, wherein the gelled polymer electrolyte comprises from 40 to 80% by weight of polymer binder $P_2$, with respect to the total weight of the gelled polymer electrolyte.

9. Battery according to claim 1, wherein the polymer binder $P_2$ is a mixture of a polymer $P_{2-A}$ and of a polymer $P_{2-B}$, said polymer $P_{2-A}$ making it possible to dissolve the lithium salt $L_1$ present in a high concentration in the gelled polymer electrolyte and said polymer $P_{2-B}$ making it possible to provide the mechanical strength of said gelled polymer electrolyte.

10. Battery according to claim 9, wherein the polymer $P_{2-A}$ is a polymer comprising several ether units and the polymer $P_{2-B}$ is a halogenated polymer.

11. Battery according to claim 1, wherein the O/Li ratio of the gelled polymer electrolyte ranges from 3 to 10.

12. Battery according to claim 1, wherein the gelled polymer electrolyte comprises from 1 to 35% by weight of liquid linear or cyclic polyether, with respect to the total weight of the gelled polymer electrolyte.

13. Process for the manufacture of an organic lithium battery as defined in claim 1, wherein said process comprises the following stages:

A) a stage of preparation of a gelled polymer electrolyte, said process additionally comprising the following sequences B1:

B1) a stage of assembling a positive electrode, a negative electrode, and a gelled polymer electrolyte prepared in stage A).

14. Organic lithium battery comprising:

a negative electrode comprising lithium metal or an alloy of lithium metal, a positive electrode optionally supported by a current collector, said positive electrode comprising at least one redox organic structure comprising at least two carbonyl C=O functional groups, two thione C=S functional groups or two imine C=N functional groups, at least one polymer binder $P_1$ and at least one agent generating electron conductivity, said redox organic structure being different from sulphur-comprising agents chosen from elemental sulphur $S_8$ and sulphur-comprising organic compounds comprising at least one S—S bond, said organic lithium battery being characterized in that it additionally comprises an electrolyte comprising at least one lithium salt $L_1$ and at least one liquid linear or cyclic polyether with a molar mass of less than or equal to 10 000 g·mol$^{-1}$, wherein;

the electrolyte is a gelled polymer electrolyte, and it additionally comprises at least one polymer binder $P_2$ which is soluble in the liquid linear or cyclic polyether with a molar mass of less than or equal to 10 000 g·mol$^{-1}$, and the concentration of lithium salt $L_1$ in said gelled polymer electrolyte is such that the O/Li ratio is at most 15, it being understood that, in the O/Li ratio, "O" denotes the number of oxygen atoms provided by the ether units of the liquid linear or cyclic polyether with a molar mass of less than or equal to 10 000 g·mol$^{-1}$, and optionally by the ether units of the polymer binder $P_2$, if it contains them, and "Li" denotes the number of lithium ions provided by the lithium salt $L_1$, and wherein the positive electrode comprises from 1 to 30% by weight of said agent generating an electron conductivity, with respect to the total weight of the positive electrode.

15. Organic lithium battery comprising:

a negative electrode comprising lithium metal or an alloy of lithium metal, a positive electrode optionally supported by a current collector, said positive electrode comprising at least one redox organic structure comprising at least two carbonyl C=O functional groups, two thione C=S functional groups or two imine C=N functional groups, at least one polymer binder $P_1$ and at least one agent generating electron conductivity, said redox organic structure being different from sulphur-comprising agents chosen from elemental sulphur $S_8$ and sulphur-comprising organic compounds comprising at least one S—S bond, said organic lithium battery being characterized in that it additionally comprises an electrolyte comprising at least one lithium salt $L_1$ and at least one liquid linear or cyclic polyether with a molar mass of less than or equal to 10 000 g·mol$^{-1}$, wherein;

the electrolyte is a gelled polymer electrolyte, and it additionally comprises at least one polymer binder $P_2$ which is soluble in the liquid linear or cyclic polyether with a molar mass of less than or equal to 10 000 g·mol$^{-1}$, and the concentration of lithium salt $L_1$ in said gelled polymer electrolyte is such that the O/Li ratio is at most 15, it being understood that, in the O/Li ratio, "O" denotes the number of oxygen atoms provided by the ether units of the liquid linear or cyclic polyether with a molar mass of less than or equal to 10 000 g·mol$^{-1}$, and optionally by the ether units of the polymer binder $P_2$, if it contains them, and "Li" denotes the number of lithium ions provided by the lithium salt $L_1$, and wherein the gelled polymer electrolyte comprises from 40 to 80% by weight of polymer binder $P_2$, with respect to the total weight of the gelled polymer electrolyte.

* * * * *